United States Patent
Sutton (12)
(10) Patent No.: US 6,397,961 B1
(45) Date of Patent: Jun. 4, 2002

(54) INDIVIDUALIZED GOLF CART

(76) Inventor: Donald J. Sutton, 5059 Wilderness Trail, Rockford, IL (US) 61114

( * ) Notice: Subject to any disclaimer, the term of this patent is extended or adjusted under 35 U.S.C. 154(b) by 0 days.

(21) Appl. No.: 09/583,974

(22) Filed: May 31, 2000

(51) Int. Cl.[7] ............................................. B60K 7/00
(52) U.S. Cl. .................. 180/65.1; 180/291; 180/89.13; 280/DIG. 5
(58) Field of Search ............................... 180/65.1, 54.1, 180/58, 60, 291, 89.12, 89.13, 90.6, 908; 280/DIG. 5, 202, 204; 296/190.01, 190.08, 183

(56) References Cited

U.S. PATENT DOCUMENTS

| | | | |
|---|---|---|---|
| 1,637,538 A | * 8/1927 | Sampson | 206/315.2 |
| 1,763,542 A | * 6/1930 | Schoenberg et al. | 187/236 |
| 1,855,068 A | * 4/1932 | Remde | 414/634 |
| 1,986,134 A | * 1/1935 | Burrows et al. | 180/292 |
| 2,242,453 A |   5/1941 | Cochran | 280/112 |
| 3,179,198 A |   4/1965 | Hastings, Jr. | 180/65 |
| 3,608,659 A | * 9/1971 | Gardner | 180/19.3 |
| 3,840,085 A | * 10/1974 | Smith | 180/14.1 |
| 3,871,464 A |   3/1975 | Eden | 180/19 S |
| 4,091,977 A | * 5/1978 | Luttbeg | 206/315.4 |
| 4,522,281 A | * 6/1985 | Snider | 180/208 |
| 4,538,695 A |   9/1985 | Bradt | 180/19.2 |
| 4,573,549 A |   3/1986 | Pankow | 180/216 |
| 4,663,923 A | * 5/1987 | Boice | 56/15.8 |
| 4,802,547 A |   2/1989 | Nakasaki | 180/216 |
| 4,848,504 A | * 7/1989 | Olson | 180/19.1 |
| 4,874,055 A |   10/1989 | Beer | 180/19.2 |
| 5,161,635 A | * 11/1992 | Kiffe | 180/193 |
| 5,277,267 A | * 1/1994 | Tiffany et al. | 180/208 |
| 5,346,028 A | * 9/1994 | Cassano | 180/19.2 |
| 5,350,982 A | * 9/1994 | Seib | 318/139 |
| 6,139,032 A | * 10/2000 | Hartman | 280/32.7 |
| 6,142,253 A | * 11/2000 | Muller et al. | 180/219 |
| 6,182,778 B1 | * 2/2001 | Henshaw et al. | 180/89.12 |
| 6,189,304 B1 | * 2/2001 | Velke et al. | 56/14.7 |
| 6,267,190 B1 | * 7/2001 | Micheletti | 180/183 |

* cited by examiner

*Primary Examiner*—Brian L. Johnson
*Assistant Examiner*—Bridget Avery
(74) *Attorney, Agent, or Firm*—Leydig, Voit & Mayer, LTD (57) ABSTRACT

An individualized golf cart comprises a golf cart body supported off the ground a pair of front steering wheels and a pair of rear driving wheels. The cart further includes a mounting structure for retaining a golf bag on the cart. A steering system is operatively coupled to the steering wheels to steer the golf cart. A propulsion system including a motor and power supply are operatively coupled to the wheels to drive the golf cart. A brake system is operatively coupled to the wheels to slow and/or stop the golf cart. A platform is attached to the cart body adjacent the driving wheels and extends rearwardly therefrom to support a person in an upright position behind the driving wheels. The platform includes a safety enclosure defining an operating station which includes access to controls for the steering system, propulsion system and brake system. The platform provides a short step to the ground, the golf bag being within reach of the golfer upon exiting the operating station.

19 Claims, 7 Drawing Sheets

INDIVIDUALIZED GOLF CART

FIELD OF THE INVENTION

The present invention relates generally to golf carts, and more particularly relates to motorized golf carts.

BACKGROUND OF THE INVENTION

Conventional motorized golf carts are designed for two persons and typically include four wheels connected to a cart body. The cart body defines a rear-section for vertically mounting two golf bags, a mid-section defining a cabin and having a seat sized for two persons, and a front-section housing the steering system. A motor and associated power supply are usually located adjacent the mid- or rear-section, and may be housed beneath the seat. The motor and steering system are operatively connected to user controls in the cabin of the vehicle, the controls typically comprising a steering wheel, gas pedal, and brake pedal, the brake pedal often including a parking brake integrally formed therein.

These carts have endured many years of success due in part to their stability and ease of handling, i.e. driving, braking and steering. Despite their success, there are several drawbacks to these conventional golf carts. It is very common for the carts to be shared by two golfers during the course of a golf round. This results in the golf cart criss-crossing all over the course, damaging fairway grass and generally slowing the speed of play by delaying the time between each individual's shots. This also requires each golfer to expend mental energy by paying attention to each of his riding partner's shots, as it is typically necessary to locate golf balls while riding together. When two players arrive at a ball, the shooter walks up to examine the lie, walks to the rear of the cart to select a club, walks back to the ball to shoot, walks back to the rear to replace the club and then enters the cart. Then they must travel to the other players ball, the same steps repeated. This results in much wasted time, as well as lost motion and potential lost concentration.

Another drawback to these conventional golf carts is the physical motion made by golfers using such a cart, such as getting in and out of the cart and retrieving clubs. The golf swing itself is unnatural and sequences a person's body through many motions, including a twisting or coiling motion of one's body around the spine. Albeit unnatural, it is the uncoiling of the body that generally produces power for a golf shot. Unfortunately, a golfer enters and exits a golf cart by simultaneously rising and twisting, or bending down and twisting. Since the golf clubs are located in the rear of the cart, directly behind the golfers, the natural tendency is to twist the body when entering or exiting. This unnecessarily results in a golfer expending physical energy that detracts from the ability of the golfer to hit succeeding shots, the degree of harm depending on the particular person. Since golf is a game enjoyed by players of all ages and size, the physical characteristics and capabilities of any given player can vary drastically. Likewise golf bags and their clubs are stored vertically in the cart's rear, the top of the clubs standing 4 or 5 feet in the air. To retrieve a club, a golfer must grab the top of the club and raise it even higher, thus straining the joints and muscles of the arms and shoulders.

In an attempt to overcome the drawbacks associated with having two golfers share a cart, several devices have been proposed where an individualized golf cart is provided to eliminate the unnecessary criss-crossing and delay between a single golfer's shots. A common principle linking these devices is to provide a small, individualized motorized cart that can be easily transported to and from a golf course by a person's vehicle, eliminating the need to rent a full-sized golf cart as well as the problems noted above. These devices are three-wheeled for simple steering, and provide a small wheel-base and adjustable frame structure that permits the carts to be transported easily or even pulled manually.

Nonetheless, these three-wheeled carts themselves pose several problems. The carts have a small wheel-base as defined by the three-wheels. This construction makes the golf carts prone to tipping or rolling over, which can lead to unfortunate results. Further, very little, if anything at all, separates a riding golfer from the rear wheels of the cart, creating the potential for hands, feet and clothing to become entangled with the rear wheels. Moreover, these individualized golf carts are not structured to eliminate the twisting motion of the body and raising motion of the arms.

SUMMARY OF THE INVENTION

In light of the above, a general object of the present invention is to provide a golf cart for a single golfer that allows that golfer to maximize his or her concentration on the shot by minimizing the lost motion and distraction normally associated with getting from the cart to the shot with the correct club in hand.

It is a related object of the present invention to provide an individualized golf cart that eliminates the unnecessary expenditure of physical energy that can be used in a golfer's swing.

In that regard, it is also an object of the present invention to minimize the bending or straightening, and twisting motion used when entering or exiting the golf cart. Similarly, it is a related object of the present invention to provide a golf cart that minimizes the twisting motion used to access a mounted golf bag and the arm raising motion used to retrieve golf clubs.

It is another object of the present invention to provide an individualized golf cart having increased stability and improved handling characteristics.

It is yet another object of the present invention to provide an individualized golf cart that supports a golfer within the cart in a safe manner.

In accordance with these objects, the present invention provides a golf cart comprising a golf cart frame supported off the ground by four wheels. The cart further includes a mounting structure linked to the frame for retaining a golf bag on the cart. A platform is attached to the frame adjacent the rear wheels and extends rearwardly therefrom to support a person in an upright position behind the rear wheels. The individualized cart allows a golfer to concentrate on his or her game with less distraction and speeds up play, while the platform is easily accessible and provides a heighten view for easier location of a golf ball.

It is a feature of the present invention to provide a side exit from the platform whereby the golfer can easily perceive and retrieve a golf club after stepping from the platform, as well as be near the golf ball to minimize lost motion. By standing on the platform and stepping down to exit, the golf cart does not promote rising and twisting or bending and twisting as in prior carts. This also eliminates much of the movement to and from the cart, streamlining play and preserving the golfer's energy.

It is a related feature of the present invention to dispose the golf bag mounting structure so that the golf bag is inclined and positioned transverse to the direction of motion. Preferably, the open end of the golf bag is positioned on the same side as the exit for the platform to provide easy access to the golf clubs and eliminating unnecessary arm raising or body twisting motions. The mounting structure may comprise a open ended tube sized to receive a golf bag. The tube may be sized to receive a substantial portion of the golf bag, leaving only the club heads projecting from the golf cart.

It is a further feature of the present invention to provide a conventionally sized golf cart frame supported off the ground by four wheels including two laterally spaced front wheels and two laterally spaced rear wheels. The conventional size and four wheels provide an individualized golf cart having excellent stability and handling characteristics.

It is a feature of the present invention to provide a propulsion system, generally comprising a motor and associated power supply, and to dispose the propulsion system and platform on opposing sides of a rear axis formed by the laterally spaced rear wheels. By doing so, the weight of a golfer on the platform may be counterbalanced by the propulsion system to ensure a stable vehicle that is well balanced. The power supply is preferably spaced a distance from the rear wheels, the distance being greater than the distance the platform is spaced behind the rear wheels. It is also preferable to dispose the power supply adjacent the front wheels.

It is another feature of the present invention to provide the platform with a vertical guard wall to define an operating station. Controls for the steering system, propulsion system and braking system are disposed adjacent the operating station. The guard wall separates the platform interior from the rear wheels, providing safety to the golfer. The wall also aides in keeping a golfer within the platform area. Additionally, a seating ledge, back rest and/or seat may be connected to the vertical guard wall to provide additional comfort and support to the golfer while positioned on the platform.

These and other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
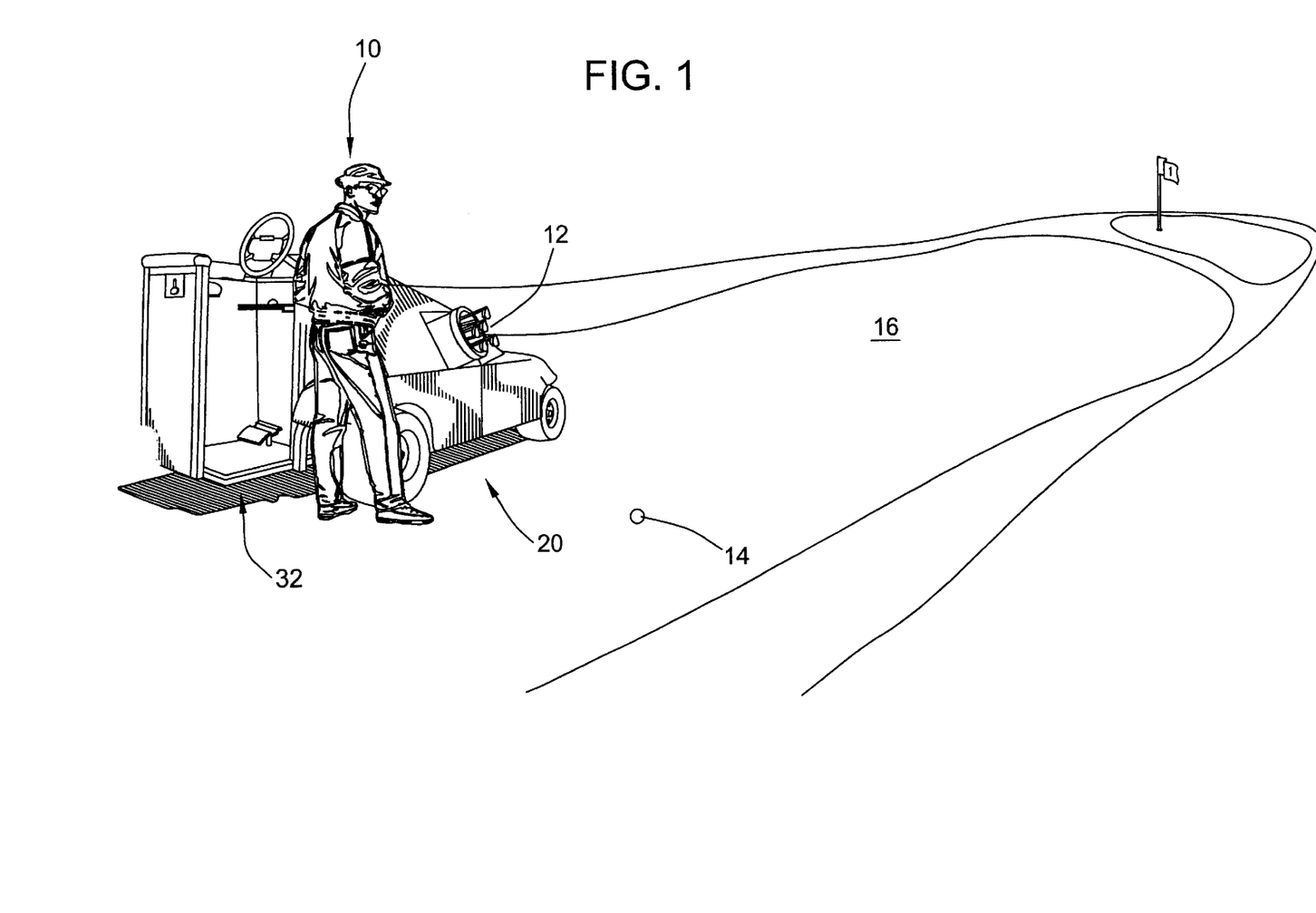
FIG. 1 is a perspective view of a preferred embodiment of the golf cart on a golf course.

Referring now to the drawings, FIG. 1 shows a golf cart 20 exemplifying a preferred embodiment of the present invention. The golf cart 20 includes a platform 32 where a golfer 10 stands to operate the cart 20, typically over a golf course 16. By way of the inventive features of the present invention, it will be readily understood by one of ordinary skill in the art that through the use of the golf cart 20 and its platform 32, a golfer may easily locate his ball 14 without the distraction of an accompanying rider. Further, the golfer 10 can exit the platform 32 to find his clubs 12 and ball 14 within easy reach for minimizing the motions required to retrieve a club and take a shot. Thus the golfer can focus on finding his or her ball, then simply select a club, hit a shot, and returning to the cart with minimal distraction and very little, if any, wasted motion. The side exit of the platform 32 minimizes the twisting, bending and raising motions that can detract from the strength and energy of the golfer when playing golf. Further, the golf cart is sized, structured and balanced to provide an extremely stable vehicle that is comfortable to ride for golfers of all ages, sizes and abilities. It will further be appreciated that a golfer on the platform 32 is separated from the rear wheels, providing safety to the golfer.

Figure 2:
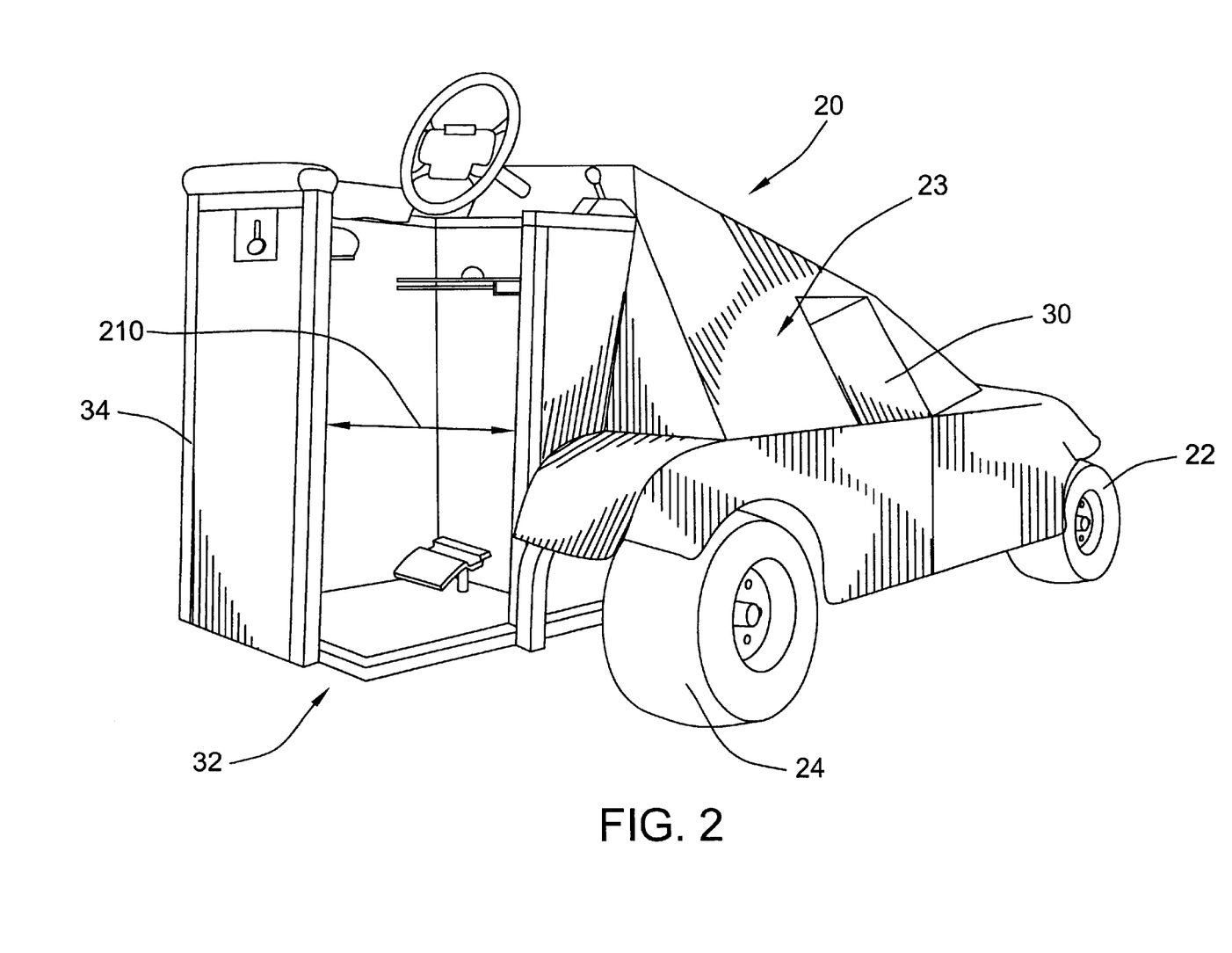
FIG. 2 is a perspective view of a preferred embodiment of the golf cart according to the present invention.

FIG. 2 shows a more detailed view of the golf cart 20 of FIG. 1. The individualized golf cart 20 generally comprises a chassis or body defined by a conventionally sized golf cart frame 26 (shown in FIG. 3) supported off the ground by four wheels including two laterally spaced front wheels 21, 22 and two laterally spaced rear wheels 23, 24. The lateral direction is to be distinguished from the longitudinal direction, which is the direction of the motion for the cart, i.e. forward and rearward. The golf cart 20 further includes a mounting structure 30 for retaining a golf bag on the cart. A steering system is operatively coupled to the wheels, preferably the front wheels 21, 22, which are pivotable to direct the cart 20. A propulsion system is operatively coupled to the wheels, preferably the rear wheels 23, 24, to drive the golf cart 20. Likewise, a brake system is operatively coupled to the wheels to slow the golf cart 20.

In practicing the invention, a platform 32 is attached to the cart 20, preferably to its frame 26 adjacent the rear wheels 23, 24 to support a golfer in an upright position. A safety enclosure or guard wall 34 is provided around a portion of the perimeter of the platform 32 to protect the golfer, partially support the golfer, and assist the golfer on remaining on the platform 32 in a safe and secure manner. The wall 34 provides an exit 210 disposed generally on a lateral side of the golf cart 20, where access to a golf bag mounted on support structure 30 can also be found. Controls for the steering system, propulsion system and brake system are positioned proximate platform 32 for operation of the golf cart 20. It will be understood that while the platform exit and access to the clubs is shown in the figures as being on the right side of the cart, the same may be provided on the left side of the cart without departing from the scope and spirit of the invention.

Figure 6:
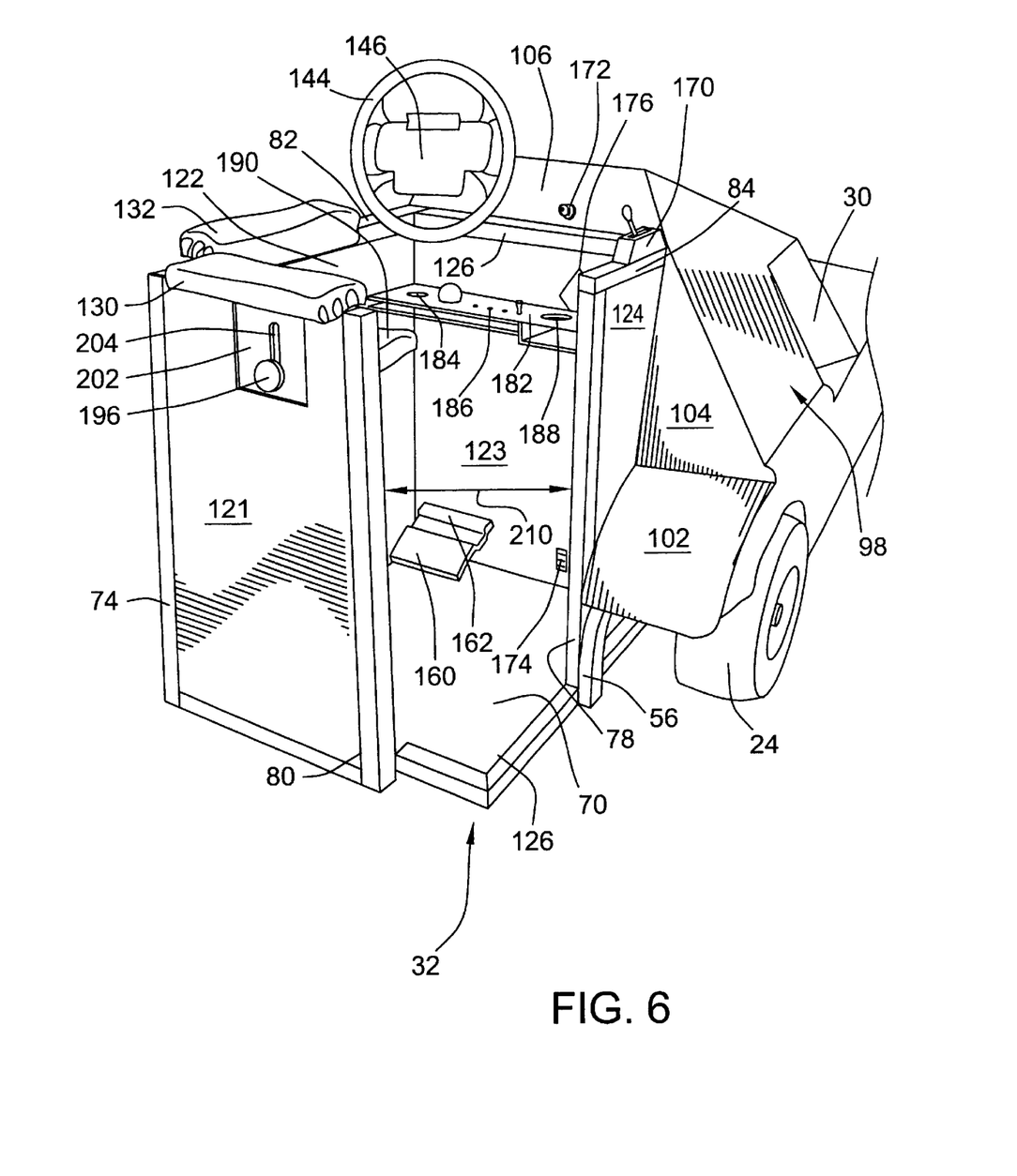
FIG. 6 is a detailed view of the platform of the golf cart of FIG. 2.
Figure 7:
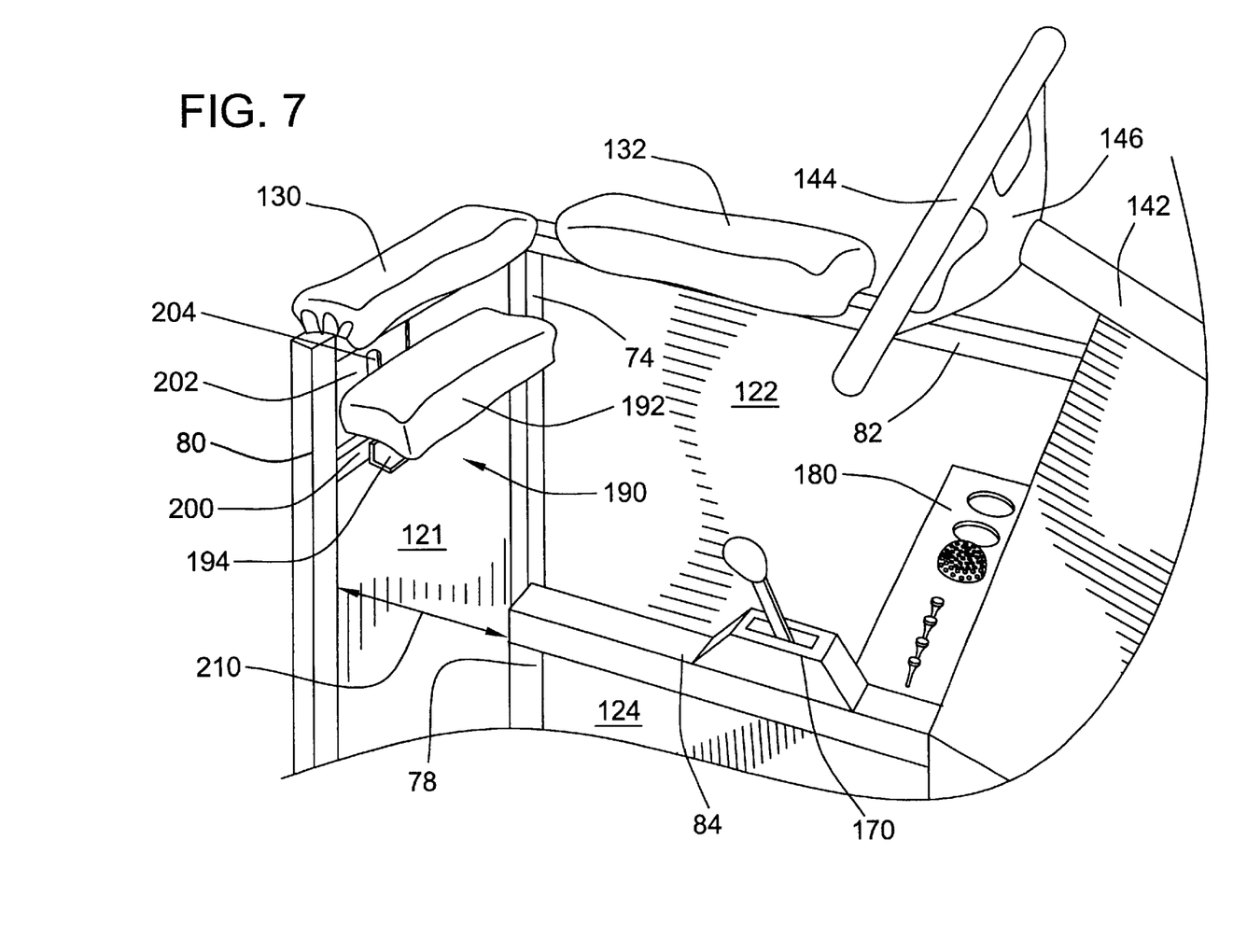
FIG. 7 is a perspective view of a portion of a platform of the golf cart of FIG. 2.

Referring to FIGS. 2, 6 and 7, it can be seen that the vertical exit posts 78, 80 define an exit 210 from the platform 32. The exit 210 is primarily disposed in a lateral direction, although a small portion on the rear edge of the platform 23 has also been left exposed to provide a wider exit 210 that is accessible from a wider range of locations around the platform 32. Although not shown, the exit may include a retractable gate to provide further security in the guard wall 34. It will be appreciated that the exit from the platform 32 is disposed laterally on a side of the golf cart 20 which also includes access to the mounting structure 30 for the golf clubs. A golfer can easily get in and out of the platform and access the golf clubs without any twisting or coiling of the body which would detract from the golfer's swing. Further, a golfer is not bending or straightening every time he or she exits the golf cart which also detracts from a golfer's swing. The proximity of the platform exit 210 and the mounting structure 30 for the golf bag allows the golfer to easily access his or her clubs quickly and be near the golf ball. As will be discussed herein, the golf bag is disposed generally perpendicular to the longitudinal axis (i.e. the direction of forward motion), and not only is laterally disposed but is also disposed on an angle relative to the ground. Thus, the clubs are positioned with their heads angled upwardly providing the user with clear vision of each of the clubs. Furthermore, the clubs may be easily retrieved from the golf bag and mounting structure 30 without raising one's arms way above their head, thereby preventing any unnecessary strain in the arms and shoulders.

Figure 3:
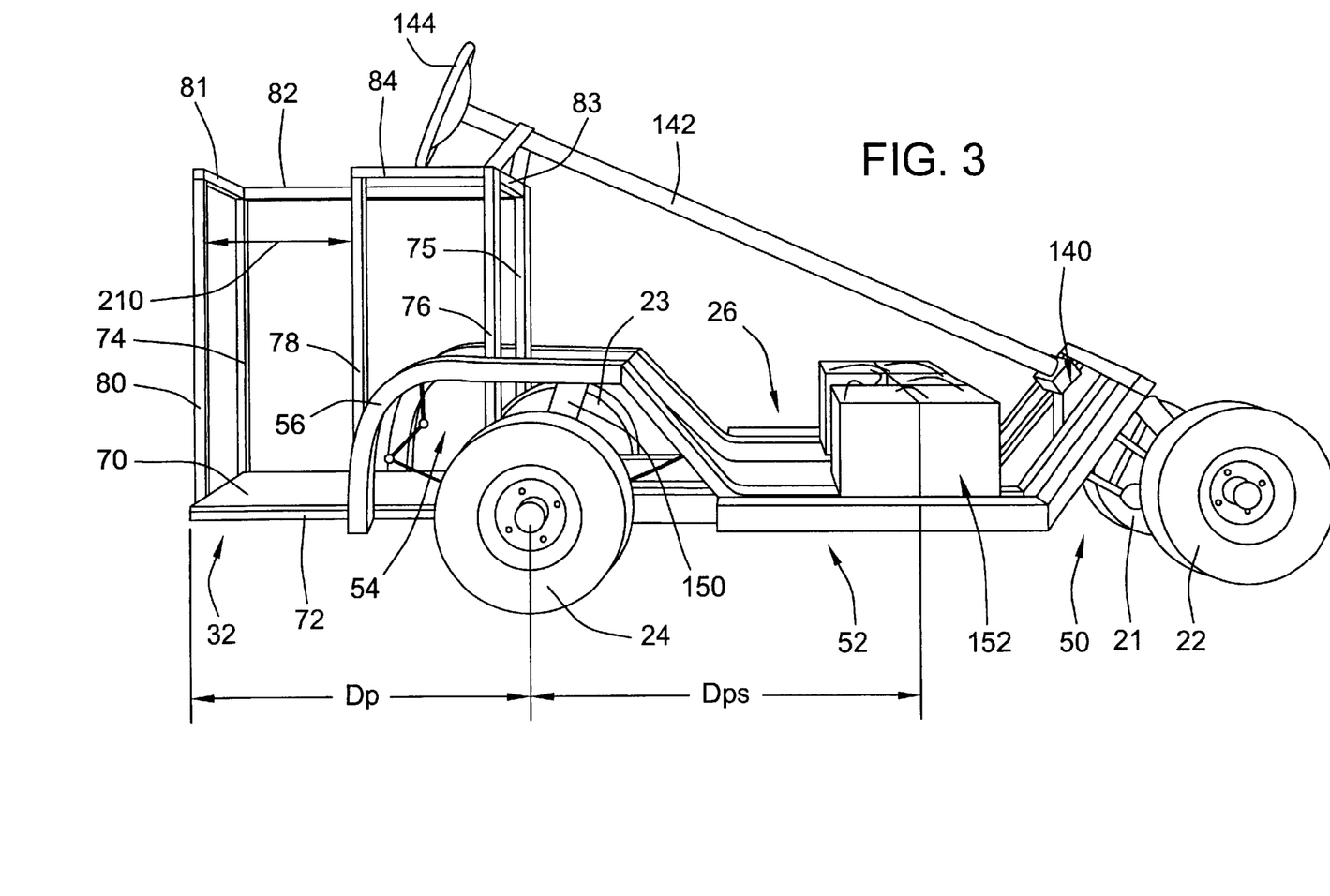
FIG. 3 is a perspective view of the golf cart of FIG. 2 having the cover removed.

Turning to FIG. 3, a preferred embodiment of the golf cart 20 is shown having the cover 28 removed, revealing the frame 26. The frame 26 generally includes a front section 50, a mid section 52 and a rear section 54. The frame 26 of the golf cart 20 is conventionally sized, i.e. represents a standard golf cart. For example, the wheel base, both side to side and front to back is conventionally sized. The wheel base from front to back i.e. the center of wheel 22 to the center of wheel 24, is in the range of 50 to 80 inches, preferably about 65 inches. The wheel base from side to side, i.e. the center of wheel of 21 to the center of wheel 22 is in the range of 24 to 44 inches, preferably about 34 inches. The frame 26 is generally about 8 inches off the ground.

The front section 50 mechanically links the frame 26 to the front wheels 21, 22, as well as the steering system 140 which is operatively connected to wheels 21, 22. The steering system 140 includes an elongated shaft 142 extending rearwardly from the front section 50 to locate a steering wheel 144 adjacent the platform 32, thereby providing a golfer with control over the steering system 140. The mid section is generally planar, and may provide all or a portion of the mounting structure 30 although this is not done in the preferred embodiment. The mid section 52 of the frame 26 supports the propulsion system including the power supply 152 for the motor 150. Golf carts are generally of the gas or electric type, and the preferred embodiment as illustrated in the figures is an electric golf cart. Thus, the power supply in this case comprises a bank of batteries 152, although in other cases the power supply 152 could comprise a tank for gasoline or other fuel. It can be seen that the power supply 152 is located adjacent the front section 50, near the front wheels 21, 22.

By locating the power supply 152 near the front wheels and a distance away from the rear wheels 23, 24, a golfer standing on the platform 32 may be counterbalanced by the weight of the power supply 152. As show in FIG. 3, the power supply is located a distance $D_{ps}$ from the center of the rear wheels 23, 24 that is at least as great as the distance which the platform 32 projects rearwardly from the rear wheels 23, 24 denoted $D_p$. The stability of the vehicle was tested by placing a 400 pound person on platform 32 of the golf cart 20, who entered and exited the platform as well as use the golf cart in a typical manner. The weight balancing of the cart adequately supported the person and the golf cart 20 continued to exhibit superior handling and stability characteristics.

The power supply 152 is operatively connected to the motor 150 which is supported on the frame 26 near the rear section 54. The motor 150 is generally disposed adjacent the rear wheels 23, 24. The rear section 54 mechanically links the frame 26 to the rear wheels 23, 24, which may include suspension springs and/or shocks as desired. The rear section 54 includes two L-shaped beams 56 which are laterally spaced apart and located adjacent the rear wheels 23, 24. The beams 56 conform to the wheels, as each beam includes a horizontally disposed portion and a vertically disposed portion thereby defining the L-shape. It will also be appreciated that while the power supply 152 is forwardly disposed to counter-balance a golfer, the motor 150 may likewise be used to counter-balance, either alone or in conjunction with the power supply 152 by positioning the same a distance in front of the rear wheels 23, 24.

The platform 32 is attached to the rear section 54 of the frame 26. The platform 32 generally comprises a planar floor 70 supported on a corresponding floor support frame 72 which is connected to the L-shaped beams 56, and more particularly the vertically disposed portion. The support frame 72 is generally rectangular or square, but may take other shapes as well. In the preferred embodiment, the platform 32 is approximately 23 inches by 28 inches, and is supported about 8 inches above the ground. A safety enclosure or guard wall 34 is attached to the platform 32 to provide safety and support to a golfer.

The guard wall 34 is generally defined by a plurality of vertical posts, including three corner posts 74, 75, 76 and two exit posts 78, 80. The vertical posts are about 2 to 4 feet tall, and preferably about 3 feet in height. The vertical posts are connected by horizontal rails. Horizontal rail 81 connects exit post 80 and corner post 74. Horizontal rail 82 connects corner post 74 and corner post 75. Rail 83 connects corner post 75 and corner post 76. Completing the wall, horizontal rail 84 connects corner post 76 and exit post 78. It will be appreciated that no horizontal rail connects the two exit posts 78, 80, thereby providing an exit area 210 for both entering and exiting the platform 32. Corner posts 75 and 76 are connected to the horizontally disposed portion of the L-shaped beams 56 while post 78 is connected to the vertically disposed portion to securely attached the guard wall 34 to the frame 26.

The guard wall 34 is preferably paneled, as will be discussed herein, although the use of posts and rails alone to form a more open fence type barrier may be desirable. It may be desirable for the guard wall to simply comprise a front barrier disposed to separate the operating station from the rear wheels, or it may simply comprise a restraint positioned above the platform to provide support for a golfer on the platform. Similarly, the guard wall may be connected to the frame or body of the golf cart rather than the platform itself, so long as the guard wall or safety enclosure is disposed in the vicinity of the platform. Further, the guard wall may be of practically any orientation and height, the aim of the wall being to define an operating station, physically assist the golfer when on the platform and protect the golfer. As such, the wall is typically over one or two feet tall, and preferably about three feet high in the rear to correspond with the waist level of most people.

Figure 4:
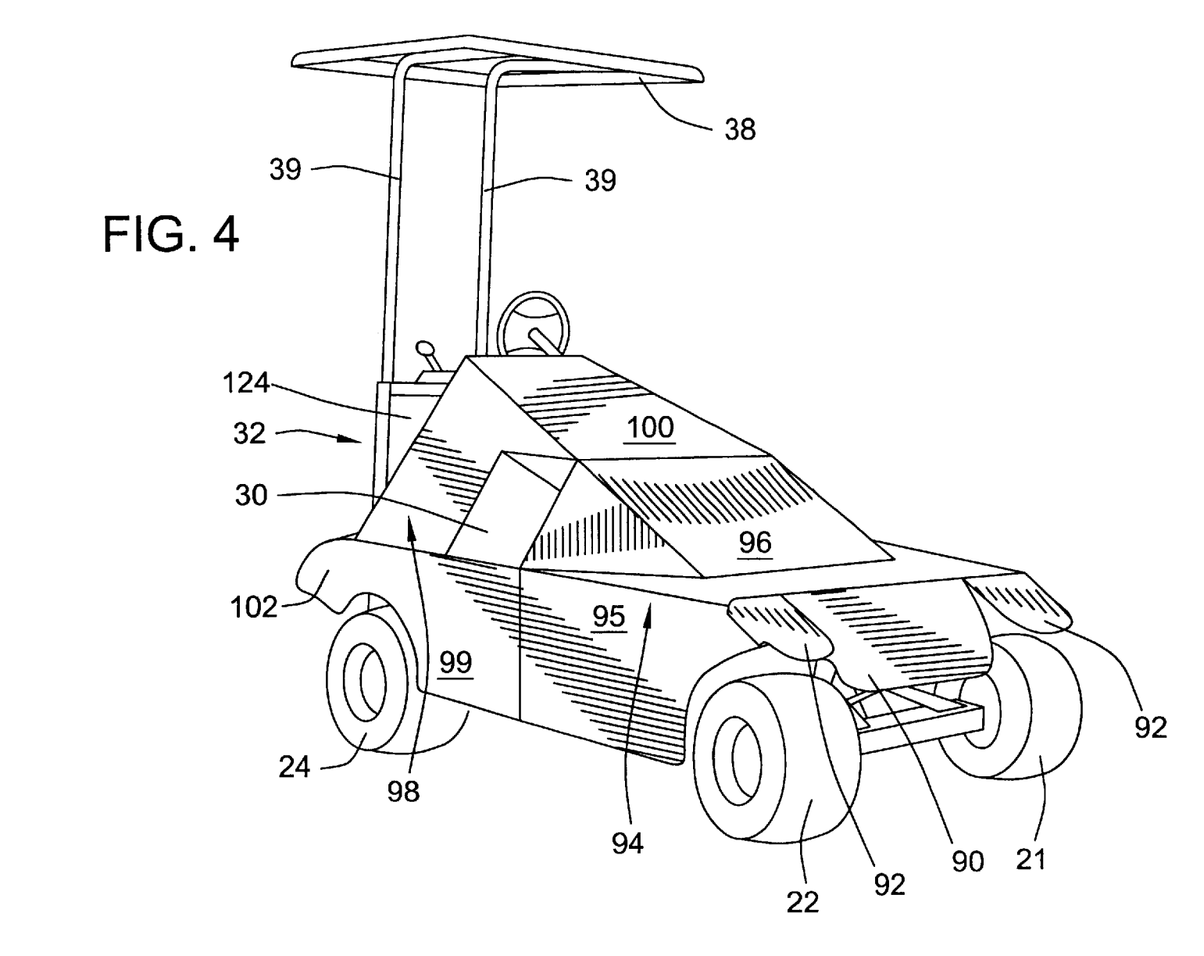
FIG. 4 is a perspective view of the golf cart of FIG. 2 having an awning attached thereto.
Figure 5:
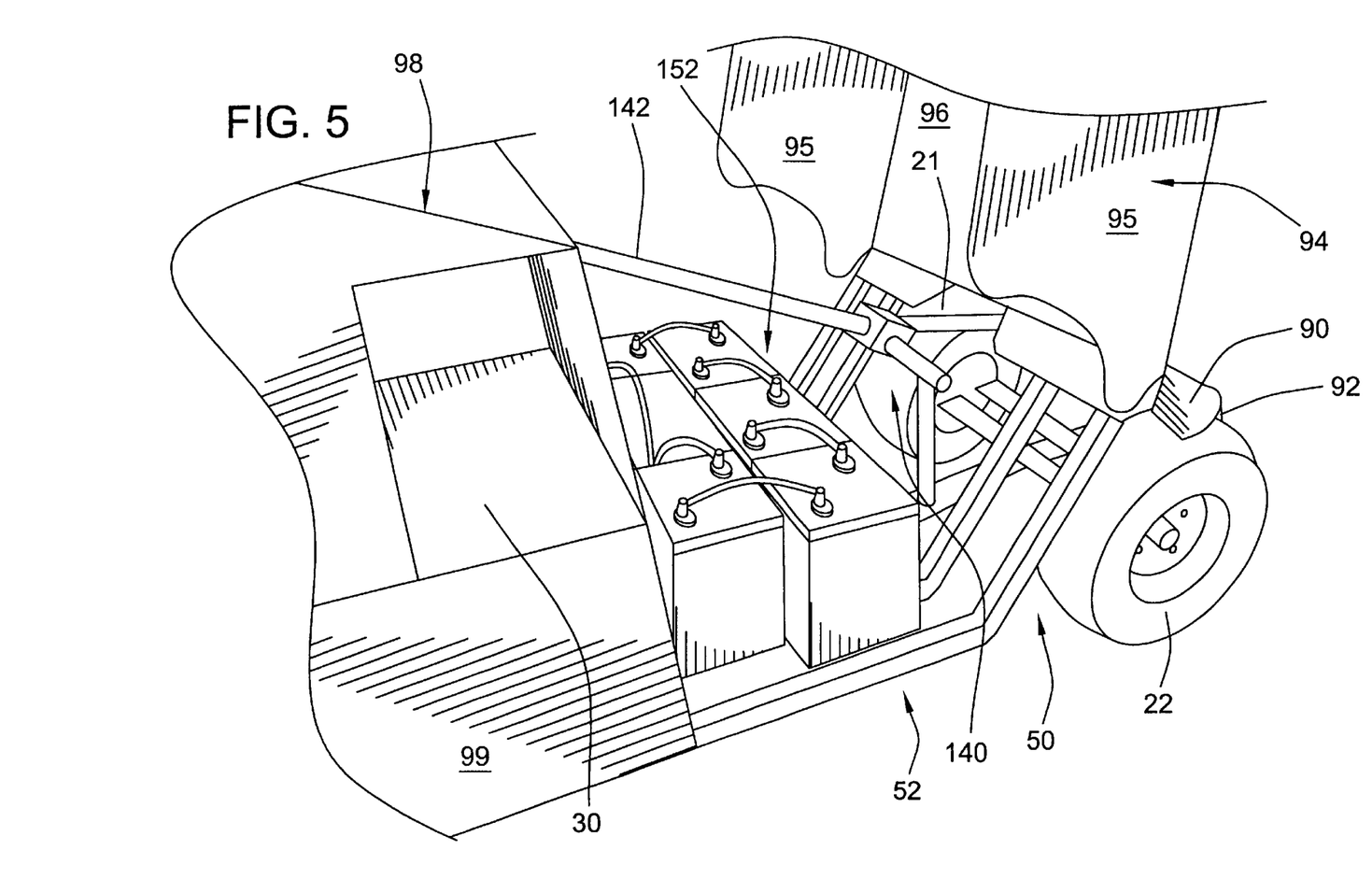
FIG. 5 is a perspective view of the golf car to FIG. 2 having the hood in a raised position.

Referring to FIG. 4, the golf cart 20 is shown having the cover 28 attached to the frame 26 to define the body of the vehicle. The cover is preferably made of fiberglass or sheet metal or any other structurally adequate material as is known in the art. Further, the cart 20 can have a decorative cover 28, such as stainless steel emulating certain classic automobile looks. The cover 28 of the preferred embodiment includes a front panel 90 as well as front wheel flaps 92. A paneled hood 94 includes two generally parallel sides 95 connected by a top 96. It can be seen that the top 96 of the paneled hood 94 includes a three sided angle portion which is adapted to allow the elongated shaft 142 to extend from the front of the vehicle to the platform 32. As best illustrated in FIG. 5, the hood 94 is pivotally attached to the front section 50 of the frame 26. Moving towards the rear, the cover 28 further includes a paneled body 98. The body 98 includes two generally parallel sides 99 which are congruent with the sides 95 of the hood 94. Similarly, the body 98 includes a top 100 which is three sided and angled, also congruent with the angled portion of the hood's top 96. The body 98 also includes two wheel covers 102 for the rear wheels 23, 24, best seen in FIG. 6. As shown in FIG. 6, the paneled body 28 also includes a rear panel 104 connecting the top portion 100 and wheel cover 102. Further, the body 28 includes a dash 106 which will be discussed in more detail herein. FIG. 4 is also illustrative in that it shows an awning 38 attached to the platform 32 by way of vertical post 39. The awning 38 may be removable and adjustable, and is securely fixed to the cart.

In accordance with another aspect of the present invention, the paneled body 98 defines a mounting structure 30 for receiving and retaining a golf bag. The structure 30 is generally tubular in nature, and as shown in FIGS. 4 and 5 in the illustrated embodiment, has a rectangular or square cross section. The depth of the tubular mounting structure 30 is sized to accommodate standard golf bags and to allow the club heads to project slightly from the cover 28 of the golf cart 20. In the preferred embodiment, the cover 28, and particularly the body 98 defines the mounting structure 30. However, it will be readily understood by those having skill in the art, and with reference to FIG. 3, that the frame 26 may also provide the mounting structure 30, alone or in conjunction with the cover 28. The mounting structure 30 is found generally amidship so as not to alter the balance of the vehicle. This also positions the clubs near the platform exit for easy retrieval by the golfer upon stepping down from the platform.

The mounting structure 30 is shown in FIG. 5 wherein the tubular cavity extends from its open end on the exterior, inwardly and downwardly towards the ground. When clubs are placed in the structure 30, the angled nature of the clubs allows the golfer to readily perceive each of the clubs as well as to allow the golfer to remove a club without high strain to the arms, i.e. the golfer needs not raise his arms way above his head as in the prior art. In the preferred embodiment, the tubular mounting structure 30 is about 13 inches by 15 inches, the center of the tube being about 29 or 30 inches above the ground and about 25 inches from the center of the rear wheel 24. The mounting structure 30 supports a golf bag at 1 to 45 degrees relative to horizontal, preferably at about 15°. While the mounting structure 30 of the present invention has been shown as an open ended tubular member, it will be appreciated that the mounting structure 30 may be open sided so long as the cover securely protects the steering shaft 142. Similarly, a smooth tubular surface is not necessary, as only a few mounting points, typically at least one at the bottom and one at the top, need be provided. For example, it is well known to provide a bottom plate and straps to secure a bag, as well as to provide one or more U-shaped bars which can support a golf bag. Nonetheless, the smooth tubular surface of the mounting structure 30 of the preferred embodiment allows a golf bag and clubs to be easily slid in and out of the cart 20, yet remain securely within the golf cart for easy access.

FIG. 5 shows the hood 94 of the cover 28 in an upright position revealing the front and mid section 50, 52 of the frame 26, as well as the power supply 152 and steering system 140. It can be seen that the steering system 140 is of a conventional steering system for controlling both of the front wheels 21, 22. The power supply 152 comprises a plurality of batteries which are connected to each other and operatively connected to the motor 150 (not shown) to drive the cart. As illustrated, the power supply 152 is spaced a distance from the front wheels 21, 22. It will be appreciated that the angled front section 50 of the frame 26 can easily be restructured to permit the power supply to be located closer to the front wheels 21, 22, i.e. further forward and a spaced further from the rear wheels 23, 24. This would be useful in that the power supply 152 assists in counterbalancing a golfer on the platform 32, the two weights balanced over a pivot point defined by the laterally spaced rear wheels 23, 24 and the axle extending therebetween. While the power supply 152 can be moved further forward to allow even further weight to be placed on the platform, experimentation has shown that a 400 pound person on the platform 32 is adequately counterbalanced and the cart 20 exhibits a stable and balanced ride in such a situation. Therefore, by locating the power supply 152 closer to the front wheels 21, 22 the wheel base from front to rear (wheel 21 to wheel 23, and wheel 22 to wheel 24) can be shortened to make the golf cart 20 more compact, yet provide the same stability and balance characteristics of the preferred embodiment of the golf cart 20 as shown in the figures.

Turning now to FIG. 6, a perspective view of a preferred embodiment of the golf cart 20 is shown. The interior of the platform 32 can clearly be seen. As previously discussed with reference to FIG. 3, the guard wall 34 includes three corner posts 74, 75, 76 and two exit posts 78, 80 which are interconnected by horizontal rails 81, 82, 83, 84. Similarly, four panels connect the vertical posts and horizontal rails, namely panels 121, 122, 123, 124. Also previously mentioned, the body 98 of the cover 28 includes a dash 106 which includes apertures for user controls such as the elongated shaft 142 connected to the steering wheel 144, as well as the starter 172. In the preferred embodiment, two of the horizontal rails, namely rails 81 and 82 are covered with pads 130, 132 respectively, to provide comfort to a golfer. As a golfer is typically positioned in front of the steering wheel 144, the guard wall 34 may be used by the golfer to lean against and hence the pad 130 will provide some comfort to the posterior of the golfer. Likewise, pad 132 may be used to rest one's arm while operating the golf cart 20. To provide support a for those not tall enough for pad 130, an adjustable seating ledge 190 is provided in the guard wall 34, as will be discussed in more detail herein.

Numerous controls are provided proximate the platform 32 to allow a golfer to operate the golf cart 20. The steering wheel 144 allows the steering system to be controlled, while the starter 172 is typically key operated and starts and stops the engine. A forward and reverse control 188 is provided in panel 123. An accelerator 170 is used to throttle the engine and control the speed of the vehicle. The accelerator 170 in the preferred embodiment is a hand controlled lever as illustrated in FIG. 6, although the accelerator may be provided in pedal form for operation by foot. The accelerator 170 is spring biased to a closed position so that the cart will come to a stop should no golfer be present to operate the vehicle. A brake pedal 160 is disposed on the floor 70 of the platform 32, and integrally provides a parking brake pedal 162. The brake and parking brake pedals 160,162 are operatively coupled to the brake system (not shown) to slow and stop the golf cart 20. Although the preferred embodiment of the golf cart 20 is electric, a choke could be provided if the motor was of the gas type. Finally, a recharging outlet 174 is provided in panel 123 for recharging the plurality of batteries comprising the power supply 152.

The platform area, and more particularly the guard wall 34 provides a utility tray 180 for the golfer. The tray 180 includes a shelf 182 for storing items, holes 184 for retaining golf balls, holes 186 for retaining tees, and finally a cup holder 188 for retaining beverages. Likewise, the steering wheel 144 may include a plate 146 having a clip for retaining a score card as well as holes or apertures for tees or pencils or the like.

FIG. 7 shows more clearly the seating ledge 190 according a preferred embodiment of the present invention. The seating ledge includes a pad 192 on the upper surface and a support structure 194 on the lower surface. A support bar 200 extends between exit post 80 and corner post 74, and a plate 202 is provided connecting the horizontal rail 81 and support bar 200. The vertically disposed plate 202 includes a slot 204, while the panel 121 of guard wall 34 is notched to expose the plate 202, as best seen in FIG. 6. The support structure 194 for the seating ledge 190 is mechanically linked to a hand screw 196 which extends through the slot 204 and the plate 202, as best seen in FIG. 6 where the handle of the hand screw 196 is shown. The hand screw can be used to tighten the support structure 194 of the seating ledge against the plate 202 and hence the guard wall 34. The slot 204 is vertically disposed to provide adjustability to the seating ledge in a horizontal direction. Thus, the platform 32 and seating ledge 190 provide adjustability for golfers of all sizes.

While the seating ledge has been illustrated in FIGS. 6 and 7, it may be desirable to provide a folding or swiveling seat on the platform 32. Although standing or leaning against the guard wall 34 eliminates unnecessary bending and straightening, some golfer's may be unable to stand throughout an entire golf round. In this case, a seat may be formed into either panel 121 or panel 122 of the guard wall 34. It may further be desirable to have the seat be pivotable about a vertical axis so that a seated golfer need not twist or coil their body when straightening or bending to get in or out of the cart 20, and can merely swivel on the seat.

As also shown in FIGS. 6 and 7, a golfer standing in the platform area 32 is separated from the rear wheels 23, 24 by a plurality of barriers. These barriers include the vertical guard wall 34, particularly panels 122, 123 and 124 as well as by the vertical post and horizontal rails connecting these panels. Moreover, the wheel covers 102 of the paneled 98 of the cover 28 effectively separates the exit 210 of the platform 32 from the rear wheels 23, 24 and also prevents any mud or other debris from being sprayed on a golfer.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A single golfer golf cart comprising in combination:
a four wheeled chassis having a pair of front wheels which are pivotable for steering and a pair of rear driving wheels;
a platform for the golfer positioned substantially aft of the driving wheels, a safety enclosure above the platform which defines a standing operating station for the golfer, the operating station having a single side exit;
a propulsion system, primarily positioned to the fore of the driving wheels, controls for regulating the propulsion system being accessible to the operating station;
a steering system for the front wheels which extends to a steering wheel positioned approximately above the driving wheels and accessible to the operating station;
a brake system having a brake pedal in the operating station;
the platform being positioned in a horizontal plane such that it is a short step to the ground for a golfer exiting the operating station; and
a golf bag mounting structure carried by the chassis and positioned to support a selection of clubs within reach of the golfer after the golfer steps from the platform to the ground.

2. The golf cart of claim 1, wherein the safety enclosure includes a rear wall disposed adjacent a rear edge of the platform, the safety enclosure extending to a position at least two feet above the platform so as to provide support for a golfer standing on the platform.

3. The golf cart of claim 1, wherein the safety enclosure further includes a barrier positioned between the operating station and the driving wheels to protect a golfer situated on the platform.

4. The golf cart of claim 1, wherein the brake pedal is positioned just above the platform.

5. The golf cart of claim 1, wherein the controls for the propulsion system include a hand control positioned in a forward portion of the operating station on the same side of the golf cart as the golf bag mounting structure.

6. The golf cart of claim 1, wherein the propulsion system includes a motor operatively coupled to the driving wheels, and propulsion batteries positioned adjacent the front wheels to counter-balance a golfer situated on the platform.

7. An individualized golf cart comprising:
a golf cart frame supported off the ground by four wheels including two laterally spaced front wheels and two laterally spaced rear wheels;
a golf bag mounting structure connected to the frame and disposed to retain a golf bag on the cart;
a platform attached to the frame adjacent the rear wheels and extending rearwardly therefrom, the platform disposed to support a person in a position behind the rear wheels; the platform including a guard wall around the platform providing a side exit, the golf bag mounting structure position golf clubs within reach of a golfer exiting the platform via the side exit; and
a propulsion system including a motor and associated power supply to drive the cart, the power supply being positioned in front of the rear wheels to counter-balance a golfer situated on the platform.

8. The golf cart of claim 7, wherein the power supply is located adjacent the front wheels to counter-balance a golfer situated on the platform.

9. The golf cart of claim 7, wherein the power supply is located a distance in front of the rear wheels at least as great as the distance the platform projects rearwardly from the rear wheels.

10. The golf cart of claim 7, further comprising a steering system operatively coupled to the front wheels, the steering system including an elongated shaft disposing a steering wheel near the platform.

11. An individualized golf cart comprising:
 a golf cart frame supported off the ground by four wheels including two laterally spaced front wheels and two laterally spaced rear wheels;
 a golf bag mounting structure formed within the frame and disposed to retain a golf bag on the cart and between the platform and supply;
 a platform attached to the frame adjacent the rear wheels and extending rearwardly therefrom, the platform disposed to support a person in a position behind the rear wheels; and
 a propulsion system including a motor and associated power supply to drive the cart, the power supply being positioned in front of the rear wheels to counterbalance a golfer situated on the platform.

12. A golf cart comprising:
 a body supported off the ground by a pair of front wheels and a pair of rear driving wheels;
 the body defining a golf bag mounting structure sized and oriented to retain a golf bag on the cart in a position extending laterally and generally perpendicular to the golf cart's longitudinal axis to provide access to the clubs on a lateral side of the cart;
 a platform attached to the body adjacent the driving wheels and positioned to support a person in a generally upright position; and
 a guard wall disposed above the platform to define an operating station for a golfer, at least a portion of the guard wall being disposed between the operating station and the driving wheels to block a golfer situated on the platform from the rear driving wheels.

13. The golf cart of claim 12, wherein the guard wall provides an exit from the platform substantially on the lateral side of the golf cart where access to the clubs is provided.

14. The golf cart of claim 12, wherein a portion of the guard wall is disposed at a rearward portion of the platform to support a golfer within the operating station.

15. The golf cart of claim 12, further comprising a seating ledge attached to the guard wall.

16. The golf cart of claim 12, wherein the platform is positioned in a horizontal plane such that it is a short step to the ground for a golfer.

17. The golf cart of claim 12, wherein the golf bag supporting structure comprises an open-ended tube sized to receive a substantial portion of a golf bag.

18. The golf cart of claim 12, wherein the golf bag support structure disposes the golf bag in an inclined position and provides access to the clubs at about waist level.

19. The golf cart of claim 15, wherein the seating ledge is slidably attached to the guard wall.

* * * * *

UNITED STATES PATENT AND TRADEMARK OFFICE
CERTIFICATE OF CORRECTION

PATENT NO. : 6,397,961 B1
DATED : June 4, 2002
INVENTOR(S) : Donald J. Sutton

It is certified that error appears in the above-identified patent and that said Letters Patent is hereby corrected as shown below:

<u>Title page,</u>
ABSTRACT,
Line 1, change "comprises" to -- includes --
Line 11, after "to", insert -- define an operating station and --
Line 12, delete "The platform includes a safety enclosure defining an operating station which includes access to controls for the steering system, propulsion system and brake system."

<u>Column 10,</u>
Line 55, change "position" to -- positioning --

<u>Column 11,</u>
Line 11, after "and", insert -- power --

Signed and Sealed this

First Day of October, 2002

*Attest:*

*Attesting Officer*

JAMES E. ROGAN
*Director of the United States Patent and Trademark Office*